US010522799B2

(12) United States Patent
Hisano et al.

(10) Patent No.: US 10,522,799 B2
(45) Date of Patent: Dec. 31, 2019

(54) CELL PACK AND CONTAINER PROVIDED WITH SAME

(71) Applicant: Hitachi, Ltd., Tokyo (JP)

(72) Inventors: Nae Hisano, Tokyo (JP); Shin Yamauchi, Tokyo (JP); Mitsutoshi Honda, Tokyo (JP); Hidekazu Fujimura, Tokyo (JP); Kenji Takeda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 485 days.

(21) Appl. No.: 14/427,227

(22) PCT Filed: Jul. 31, 2013

(86) PCT No.: PCT/JP2013/070682
§ 371 (c)(1),
(2) Date: Mar. 10, 2015

(87) PCT Pub. No.: WO2014/041911
PCT Pub. Date: Mar. 20, 2014

(65) Prior Publication Data
US 2015/0214521 A1    Jul. 30, 2015

(30) Foreign Application Priority Data
Sep. 12, 2012  (JP) .................................. 2012-200052

(51) Int. Cl.
*H01M 2/10* (2006.01)
*H01M 10/6557* (2014.01)
(Continued)

(52) U.S. Cl.
CPC ..... *H01M 2/1077* (2013.01); *H01M 10/4207* (2013.01); *H01M 10/613* (2015.04);
(Continued)

(58) Field of Classification Search
CPC ............. H01M 2/1077; H01M 10/613; H01M 10/627; H01M 10/655; H01M 10/6557;
(Continued)

(56) References Cited

U.S. PATENT DOCUMENTS 5,985,483 A * 11/1999 Verhoog ............. H01M 2/1077
429/120
6,335,116 B1 * 1/2002 Yamane .............. B60L 11/1874
429/120
(Continued)

FOREIGN PATENT DOCUMENTS

JP    08-167404 A    6/1996
JP    2000-164186 A    6/2000
(Continued)

OTHER PUBLICATIONS

Machine translation of Wada et al. (JP 2010186681 A).*
(Continued)

*Primary Examiner* — Miriam Stagg
*Assistant Examiner* — Lilia Nedialkova
(74) *Attorney, Agent, or Firm* — Volpe and Koenig, P.C.

(57) ABSTRACT

A battery pack that reduces a temperature difference between single cells and can increase a battery capacity per volume and a container provided with the same are provided. A battery pack 100, includes: a battery module 10 including a plurality of single cells 1 arranged in parallel in a line; and a partition member 20 provided on a side surface of the battery module 10 and forming a flow channel 21 through which a gas for exchanging heat with the plurality of single cells 1 is flowable, and the partition member 20 is provided so that the gas flowing through the flow channel 21 and at least two single cells 1 exchange heat and is inclined
(Continued)

with respect to a direction orthogonal to an arrangement direction of the plurality of single cells 1 arranged in parallel in a line.

12 Claims, 14 Drawing Sheets

(51) Int. Cl.
    *H01M 10/613* (2014.01)
    *H01M 10/627* (2014.01)
    *H01M 10/6555* (2014.01)
    *H01M 10/6562* (2014.01)
    *H01M 10/6566* (2014.01)
    *H01M 10/42* (2006.01)

(52) U.S. Cl.
    CPC ..... *H01M 10/627* (2015.04); *H01M 10/6555* (2015.04); *H01M 10/6557* (2015.04); *H01M 10/6562* (2015.04); *H01M 10/6566* (2015.04); *H01M 2220/10* (2013.01)

(58) Field of Classification Search
    CPC ......... H01M 10/6562; H01M 10/6566; H01M 10/4307; H01M 2220/10
    See application file for complete search history.

(56) References Cited

U.S. PATENT DOCUMENTS

| | | | | |
|---|---|---|---|---|
| 2002/0028375 A1* | 3/2002 | Morishita | ........... | H01M 2/1077 429/120 |
| 2003/0151388 A1 | 8/2003 | Shimamura et al. | | |
| 2004/0201366 A1 | 10/2004 | Kimoto et al. | | |
| 2006/0091856 A1* | 5/2006 | Lee | ................... | H01M 2/1077 320/116 |
| 2006/0115720 A1* | 6/2006 | Kim | ................. | H01M 10/4207 429/156 |
| 2011/0318625 A1* | 12/2011 | Yajima | ................ | H01M 2/1077 429/120 |
| 2012/0009455 A1* | 1/2012 | Yoon | ................... | H01M 10/653 429/120 |
| 2012/0070711 A1* | 3/2012 | Souki | ................ | H01M 10/6566 429/120 |
| 2012/0129023 A1 | 5/2012 | Nakahama et al. | | |
| 2012/0183822 A1* | 7/2012 | Chung | ................ | H01M 2/1072 429/72 |
| 2013/0130080 A1* | 5/2013 | Yoon | ................ | H01M 10/6556 429/83 |
| 2013/0149583 A1* | 6/2013 | Kurita | ................ | H01M 2/1077 429/120 |
| 2013/0183564 A1* | 7/2013 | Wagner | ............... | H01M 2/1077 429/120 |

FOREIGN PATENT DOCUMENTS

| | | | | | |
|---|---|---|---|---|---|
| JP | 2001283937 A | * | 10/2001 | .......... | H01M 2/1061 |
| JP | 2003-242951 A | | 8/2003 | | |
| JP | 2004-362879 A | | 12/2004 | | |
| JP | 2007026894 A | * | 2/2007 | | |
| JP | 2007-109547 A | | 4/2007 | | |
| JP | 2008-159439 A | | 7/2008 | | |
| JP | 2010-186681 A | | 8/2010 | | |
| JP | 2012-028228 A | | 2/2012 | | |
| JP | 2012-113874 A | | 6/2012 | | |
| WO | WO 2011021843 A2 | * | 2/2011 | .......... | H01M 2/1072 |
| WO | WO-2012063567 A1 | * | 5/2012 | .......... | H01M 2/1077 |

OTHER PUBLICATIONS

English machine translation of Manabu (JP 2008159439 A) (Year: 2008).*

English language machine translation of Inui et al. (JP 2001283937 A) (Year: 2001).*

English machine translation of Tono et al. (JP 2007026894 A) (Year: 2007).*

* cited by examiner

CELL PACK AND CONTAINER PROVIDED WITH SAME

TECHNICAL FIELD

The present invention relates to a battery pack and a container provided with the same.

BACKGROUND ART

A rechargeable battery (storage battery) such as a lithium-ion rechargeable battery, for example, is used to be mounted on a ship, a railway vehicle, a motor vehicle, and the like, is used for leveling electric power obtained from renewable energy, and is used in a smart grid. In particular, the lithium-ion rechargeable battery is suitable for the above use because the lithium-ion rechargeable battery is small and has a high power density. In a case where the rechargeable battery is applied to the above use, a large battery capacity and a high battery voltage are usually demanded. In view of this, by assembling a plurality of single cells (battery cells) which are rechargeable batteries to forma battery module, the rechargeable batteries are usually used in the form of a battery pack including the battery module.

Battery characteristics of a rechargeable battery, such as a battery capacity and a battery voltage, are different depending on a temperature of the rechargeable battery. In particular, the battery characteristics are usually decreased as the temperature of the rechargeable battery is increased. Therefore, it is desirable that the battery temperature that may be increased during charging/discharging of the rechargeable battery be decreased by cooling or the like.

In a case where a plurality of single cells are assembled and used (e.g., in a case where the single cells are used in the form of a battery module or a battery pack), it is desirable to cool the single cells and reduce a temperature difference between the single cells. If the temperature difference between the single cells is increased, the battery characteristics become different between the single cells. Because a capacity of a whole battery is limited by a short-life cell, the battery characteristics of the whole battery module, the whole battery pack, or the like are decreased.

In view of this, there is known a technique for reducing, in a battery provided by assembling a plurality of single cells, a temperature difference between the single cells. Specifically, PTL 1 describes a storage battery in which a battery container housing power generation elements of single cells has a rectangular parallelepiped having short side surfaces having a narrow width and long side surfaces having a wide width, the storage battery being provided as an assembled battery having a necessary electric power capacity by connecting the plurality of single cells adjacent to each other between the short side surfaces of the battery container.

CITATION LIST

Patent Literature

PTL 1: JP-A-2000-164186

SUMMARY OF INVENTION

Technical Problems

In the technique described in PTL 1, a plurality of ribs are provided on the long side surfaces of the battery container of the single cells. The single cells are cooled by compulsorily circulating air or the like between the ribs. In order to perform compulsory circulation, a cooling fan or the like needs to be provided in some cases.

It is assumed that such cooling is performed by generating forced convection with the use of a fan or the like between fin-shaped radiators provided in a module. In a case where a plurality of modules are assembled to form a battery pack, by providing a fan in each module or providing a duct, additional costs are incurred and a capacity density is decreased because a volume of the battery pack is increased.

The invention has been made in view of the problems, and an object thereof is to provide a battery pack that reduces a temperature difference between single cells and can increase a battery capacity per volume and provide a container provided with the same.

Solution to Problems

The inventors of the invention had been diligently studied to solve the above problems, and, as a result, the inventors found that the above problems could be solved by forming a battery pack including a battery module in which a flow channel capable of generating natural convection is provided on a side surface.

Advantageous Effects of Invention

According to the invention, it is possible to provide a battery pack that reduces a temperature difference between single cells because increase in a temperature of air due to natural convection can be stopped in the middle and can increase a battery capacity per volume because a cooling device does not need to be provided in each pack and provide a container provided with the same.

DESCRIPTION OF EMBODIMENTS

Hereinafter, an embodiment (this embodiment) for implementing the invention will be described. Note that this embodiment is not limited to the following contents and can be implemented by arbitrarily modifying this embodiment within the scope of the invention.

1. This Embodiment

Figure 1:
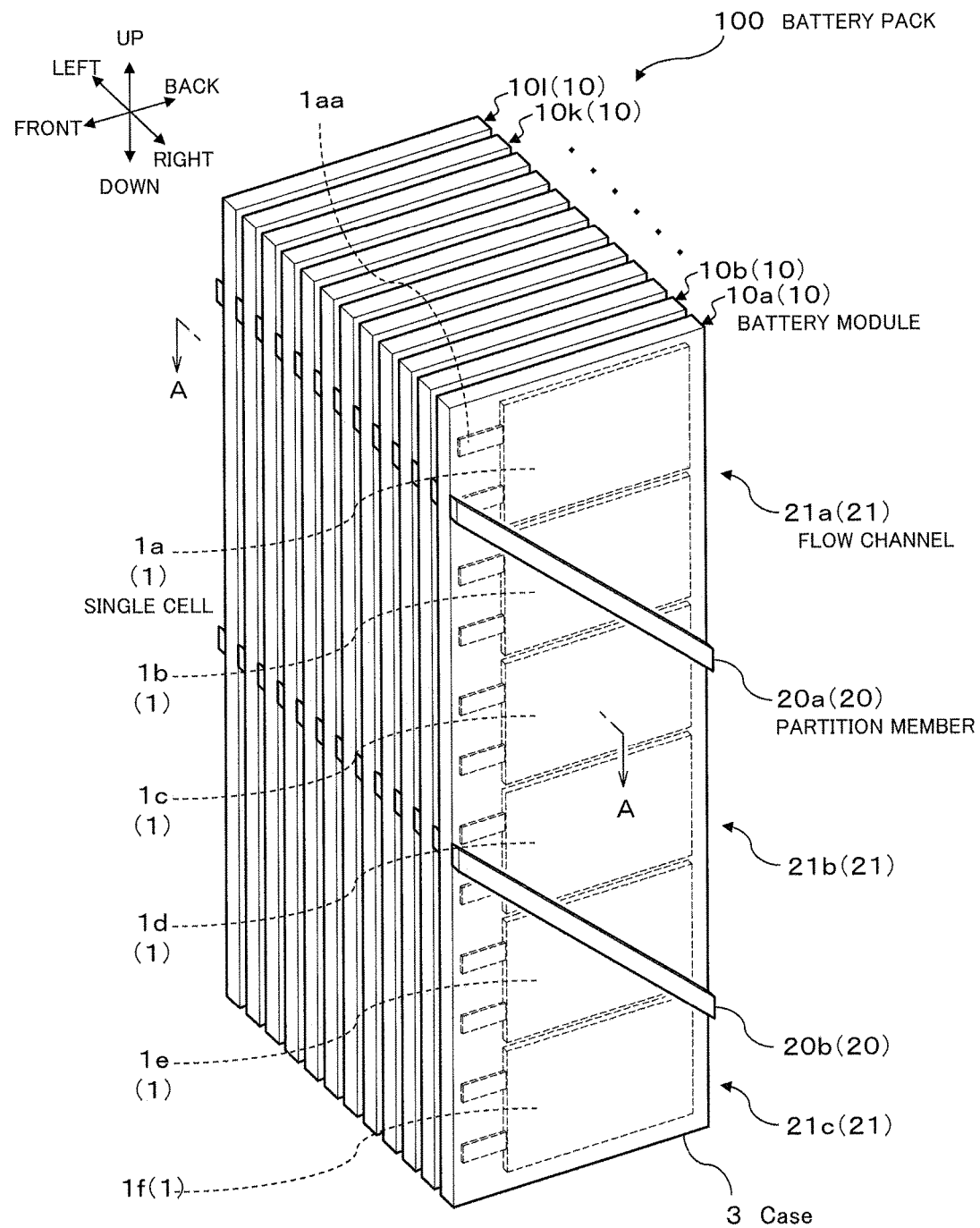
FIG. 1 is a perspective view of an external appearance of a battery pack including a battery module according to this embodiment.
Figure 2:
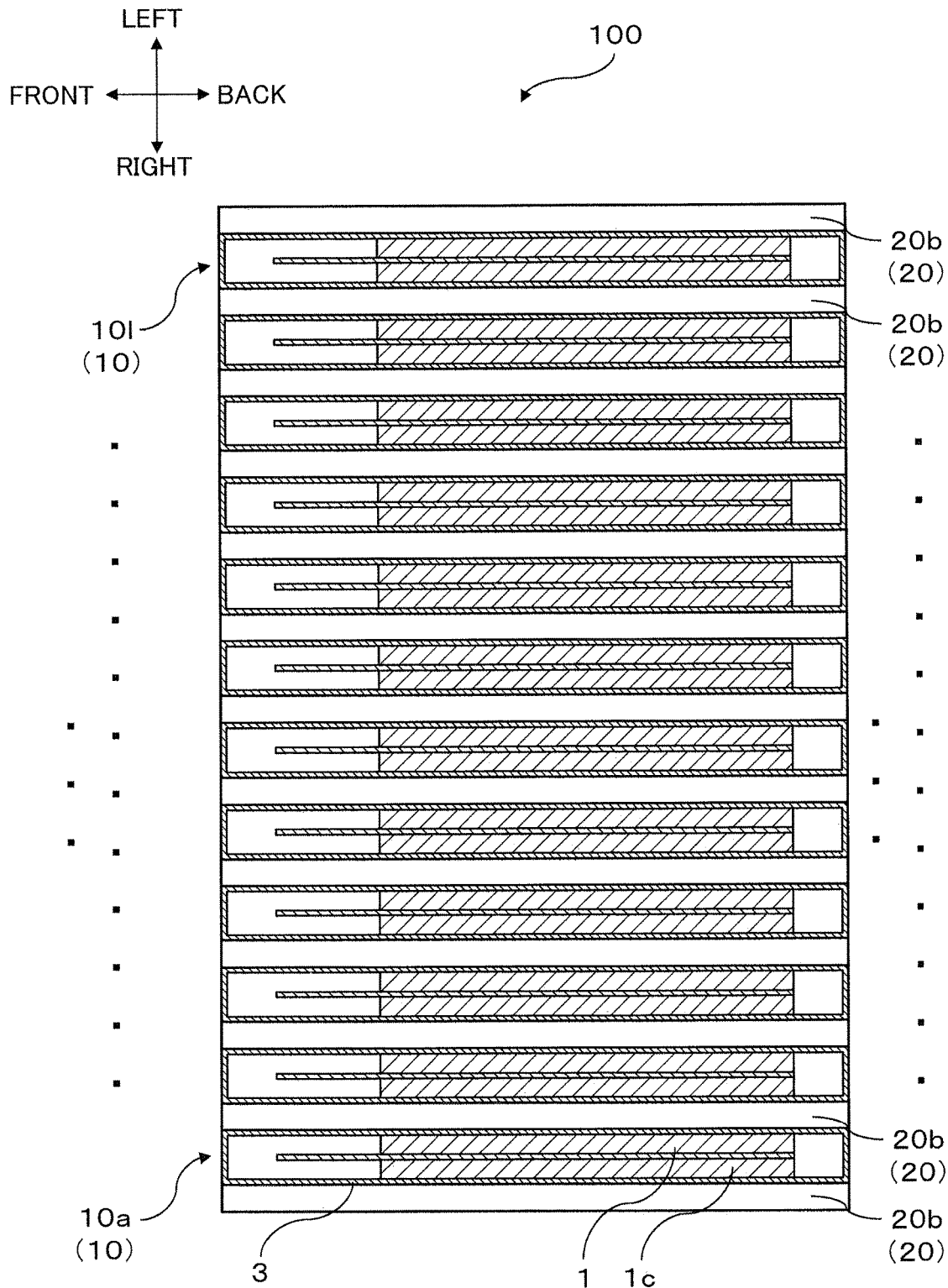
FIG. 2 is a cross-sectional view taken along the line A-A of FIG. 1.

FIG. 1 is a perspective view of an external appearance of a battery pack 100 of this embodiment. FIG. 2 is a cross-sectional view taken along the line A-A of FIG. 1. The battery pack 100 includes twelve battery modules 10 (10a, 10b, . . . , 10k, and 10l). The battery modules 10 are flat and are arranged in parallel at small intervals.

In each of the battery modules 10, six single cells 1a to 1f are arranged side by side on a front side and six single cells are similarly arranged side by side on a back side, i.e., twelve single cells in total are housed. That is, the battery module 10 includes a plurality of single cells 1 arranged in parallel in a line such that cell faces are arranged adjacent each other along a side surface of the battery module as illustrated in FIG. 1. The single cells 1 are housed in each case 3 made of a metal having a high thermal conductivity (e.g., aluminum or copper).

Partition members 20 are interposed between adjacent cases 3 (i.e., between adjacent battery modules 10) at two positions in an up and down direction. The partition members 20 are inclined to span from a side (front side) of one cell 1 on which electrode terminals 1aa are provided across portions of faces of at least two cells to a side (back side) of a different cell 1 on which the electrode terminals 1aa are not provided as illustrated in FIG. 1. That is, the partition members 20 are inclined with respect to a direction orthogonal to an arrangement direction of the plurality of single cells 1 arranged in parallel in a line. The partition members 20 are provided so that a height of the partition members 20 in the arrangement direction is gradually increased in a flow direction of a gas flowing through flow channels 21.

The electrode terminals 1aa of the plurality of single cells 1 provided side by side in a line are provided in the direction orthogonal to the arrangement direction. The partition members 20 are provided so that the electrode terminals 1aa are provided downstream in a direction of flow of the gas flowing through the flow channels 21.

The partition members 20 are formed by, for example, an elastic body such as rubber or sponge. Therefore, by pressing the adjacent battery modules 10 in a state in which the partition members 20 are interposed, the partition members 20 are interposed between the battery modules 10. In this way, the flow channels 21 (described in detail below) of air are formed. That is, the partition members 20 are provided on side surfaces of the battery modules 10 and form the flow channels through which a gas for exchanging heat with the plurality of single cells 1 is flowable. The flow channels 21 are also formed on outer side surfaces of the battery modules 10 constituting the battery pack 100 (specifically, a right side surface of the battery module 10a and a left side surface of the battery module 10l).

In the battery pack 100, three flow channels 21 (21a, 21b, 21c) are formed by two partition members 20 (20a, 20b). Air independently flows through each flow channel 21. A flow direction thereof is from the back side of the battery pack 100 to the front side thereof.

Details of the flow channels 21 will be described below with reference to FIG. 3.

Although not illustrated, the twelve single cells 1 (1a, 1b, 1c, 1d, 1e, 1f, and the like) included in the battery module 10 are connected in series with an electric wire. Further, although not illustrated, the twelve battery modules 10 (10a, 10b, . . . , 10k, and 10l) included in the battery pack 100 are connected in parallel with an electric wire. Therefore, it is possible to take out electric energy that the single cells 1 have to outside of the battery pack 100.

It is also possible to supply electric energy to the single cells 1 from the outside.

Herein, a battery pack (conventional battery pack) in which the partition members 20 are not provided will be discussed. That is, a battery pack obtained by removing the partition members 20 from the battery pack 100 illustrated in FIG. 1 will be discussed.

The single cell 1f generates heat by charging/discharging. Therefore, air around the single cell 1f is heated by the heat generated from the single cell 1f. With this, the air around the single cell 1f generates an updraft and starts to flow in an upward direction (direction toward the single cell 1a) due to natural convection. Then, the air that has flowed in the upward direction to reach around the single cell 1b is further heated by heat generated from the single cell 1b. The air is gradually heated while rising due to natural convection as described above, and a temperature of the air around the single cell 1a is the highest.

When comparing the temperature of the air around the single cell 1a with that of the air around the single cell 1f, the temperature of the air around the single cell 1a is higher. Therefore, also in terms of temperatures of the single cells 1 themselves, the temperature of the single cell 1a is higher than the temperature of the single cell 1f. Thus, a large temperature difference is easily generated between the single cells 1. In view of this, in the battery pack 100 of this embodiment, the partition members 20 are provided between the battery modules 10 to form the flow channels 21. With this, risen air is obliquely introduced along the flow channels and flows out in a forward direction of the battery pack 100.

In the battery pack 100 of this embodiment, each partition member 20 is provided so that a plurality of single cells 1 face each other via the case 3 in the flow channels 21 of air. For example, in FIG. 1, the four single cells 1b, 1c, 1d, 1e are provided via the case 3 in the flow channel 21b of air formed by the two partition members 20a, 20b.

Air, which has flowed into the flow channel 21c from a lower side and the back side of the battery pack 100, is heated by heat generated from the battery packs 1f, 1e, 1d and flows in the upward direction. However, inflow thereof in the upward direction (arrangement direction of the single cells 1) is inhibited by the partition member 20b.

A path through which the air is heated is shorter than a long side of the module, and therefore increase in a temperature of the air can be reduced. Therefore, by reducing a maximum temperature in the module, the temperature in the module can be leveled.

Note that temperatures between the single cells 1 are also leveled in the flow channels 21b, 21c in the same way as the flow channel 21a.

As described above, the partition members 20 in the battery pack 100 are provided so that the gas flowing through the flow channels 21 and at least two single cells 1

(four single cells in the battery pack 100 of this embodiment) can exchange heat. Because each of the flow channels 21 is shorter than a length of the battery module in the up and down direction, the increase in the temperature is suppressed and a whole battery temperature is leveled.

If the partition members 20 are not provided, air rises in the arrangement direction of the single cells 1 and is heated by heat generated from the six single cells 1 (1a to 1f). However, in the battery pack 100 in which the partition members 20 are provided, air flowing through the flow channel 21b is heated by heat generated from the four single cells 1 (1b to 1e). In addition, as illustrated in FIG. 1, a contact area with each of the single cells 1b, 1e is substantially half or less a size of the single cell 1. Therefore, heat received by air from the single cells 1 is reduced, as compared with a case where the partition members 20 are not provided.

As described above, the increase in the temperature of the air can be reduced by providing the partition members 20, as compared with a case where the partition members 20 are not provided. With this, air whose temperature is not largely increased flows through the flow channels, and therefore the temperatures between the single cells 1 can be leveled more securely.

Herein, the inventors of the invention further discussed such leveling of the temperatures between the single cells 1, the leveling being performed by suppressing the increase in the temperature of the air. As a result, the inventors of the invention found through an experiment that the increase in the temperature could be further suppressed by providing the partition members 20 so that inclination of the partition members 20 was 45° or more but 60° or less with respect to the direction (back and forth direction in FIG. 1) orthogonal to the arrangement direction of the single cells 1. Therefore, it was found that the partition members 20 were preferably inclined at an angle of 45° or more but 60° or less with respect to the direction orthogonal to the arrangement direction of the plurality of single cells arranged in parallel in a line.

Note that the increase in the temperature means a temperature difference between an air temperature at the time of flow into the flow channel 20 and an air temperature at the time of discharge from the flow channel 20.

It was found that the increase in the temperature could be further suppressed by adjusting the number of partition members 20. Specifically, it was found through an experiment that, in a case where three partition members 20 were provided, a degree of the increase in the temperature was reduced by 7%, and, in a case where six partition members 20 were provided, the degree of the increase in the temperature was reduced by 15%. However, the degree obtained in a case where twelve partition members 20 were provided was similar to that obtained in a case where the six partition members 20 were provided. As described above, it was found that the increase in the temperature could be further suppressed by adjusting the number of partition members 20.

The inventors of the invention further found that, in the same single cell 1, a temperature on the side (back side in FIG. 1) opposite to the side on which the electrode terminals 1aa of the single cells 1 were provided was higher than a temperature on the side (front side in FIG. 1) on which the electrode terminal 1aa were provided. Therefore, it was found through an experiment that, by providing the partition members 20 as illustrated in FIG. 1 and forming a flow of air so that the temperature of the single cell 1 on an inflow side was high and was gradually decreased in the same single cell 1, air could flow more smoothly through the flow channel 21.

Those actions are exerted without providing a cooling fan because natural convection of air is used. Therefore, a volume for providing the cooling fan can be reduced. This makes it possible to increase a battery capacity per unit volume.

An example where the battery pack 100 is provided will be described with reference to FIG. 3.

Figure 3:
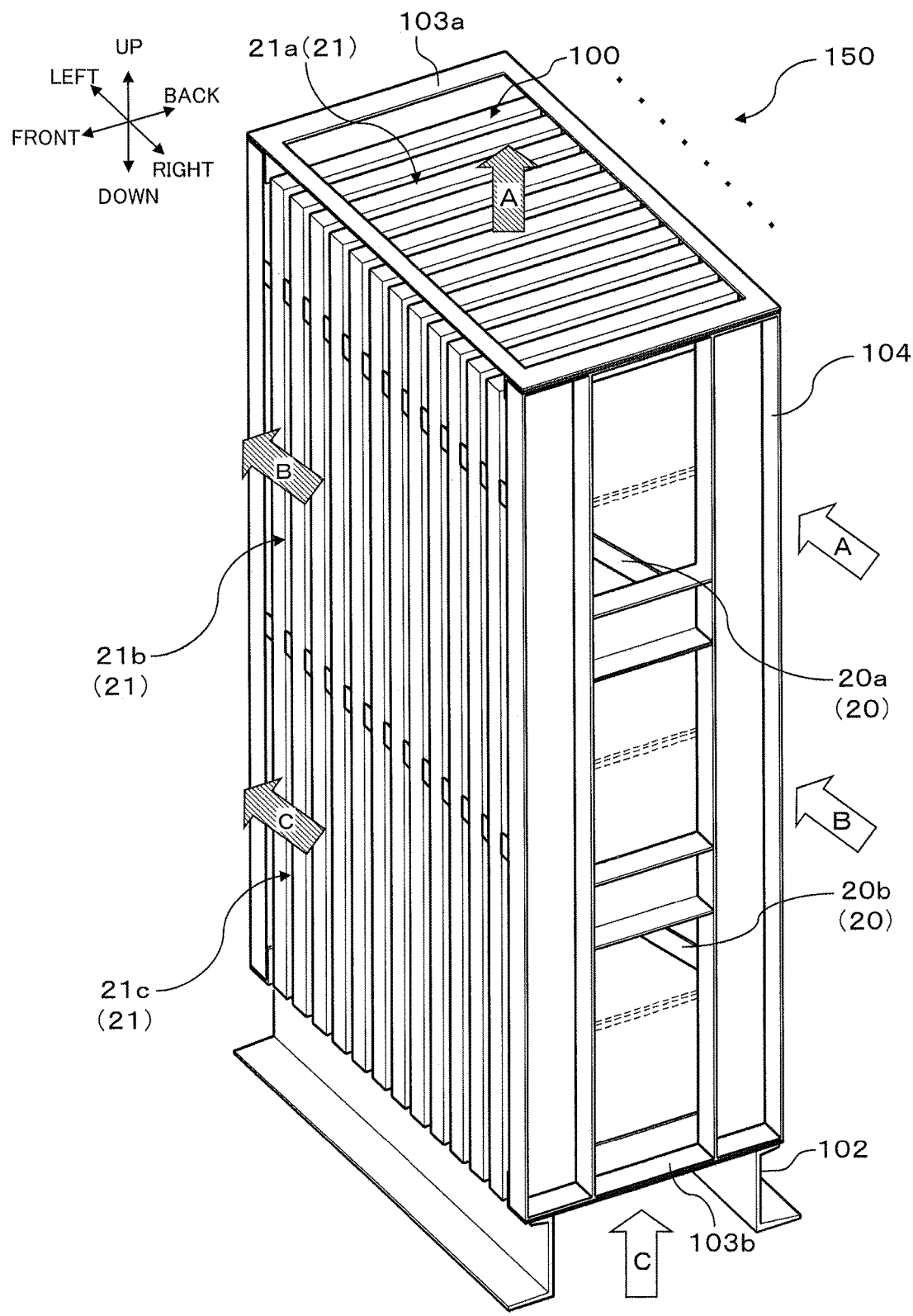
FIG. 3 illustrates an example where battery packs of this embodiment are provided.

FIG. 3 illustrates an example where the battery packs 100 of this embodiment are provided. The battery packs 100 are housed in and fixed to various members illustrated in FIG. 1, and are provided in the form of an installing battery pack 150. The installing battery pack 150 is formed by interposing, between side surface frames 104, four corners of the battery packs 100 mounted on a rectangular frame 103b. The side surface frames 104 are movable, and therefore, even in a case where the number of battery modules 10 is changed, the battery packs 100 can be easily fixed again. A rectangular frame 103a is provided above the battery packs 100.

Stand frames 102 are provided under the rectangular frame 103b, and therefore, a space is provided between a floor surface and a lower part of the installing battery pack 150. Center portions of the rectangular frames 103a, 103b are open, and air can flow in and out above and below the installing battery pack 150, as illustrated in FIG. 3.

Note that, although not illustrated, the stand frames 102, the rectangular frames 103a, 103b, and the side surface frames 104 are connected and fixed by fastening portions such as a bolt and a nut.

In the battery packs 100 fixed to the installing battery pack 150, as illustrated in FIG. 3, the flow channels 21a, 21b, 21c (21) of air are formed by the partition members 20a, 20b (20).

The flow channel 21a is a top flow channel among the provided flow channels 21. Air (white arrow A in FIG. 3) flowing from a back side of the installing battery pack 150 into the flow channel 21a is heated by the single cells 1a, 1b (see FIG. 1) that are not illustrated in FIG. 3, and an updraft is generated. Therefore, the air from the back side rises along the partition member 20a and is discharged (shaded arrow A in FIG. 3) mainly from an upper side of the installing battery pack 150 to outside.

The flow channel 21b is a middle flow channel among the provided flow channels 21. Air (white arrow B in FIG. 3) flowing from the back side of the installing battery pack 150 into the flow channel 21b is heated by the single cells 1b, 1c, 1d, 1e (see FIG. 1) that are not illustrated in FIG. 3, and an updraft is generated. Therefore, the air from the back side keeps rising along the partition members 20a, 20b and is discharged (shaded arrow B in FIG. 3) from a front side of the installing battery pack 150 to the outside.

The flow channel 21c is a bottom flow channel among the provided flow channels 21. Air (white arrow C in FIG. 3) flowing from a lower side of the installing battery pack 150 into the flow channel 21c is heated by the single cells 1e, 1f (see FIG. 1) that are not illustrated in FIG. 3, and an updraft is generated. Therefore, the air from the lower side keeps rising along the partition member 20b and is discharged (shaded arrow C in FIG. 3) from the front side of the installing battery pack 150 to the outside.

Figure 4:
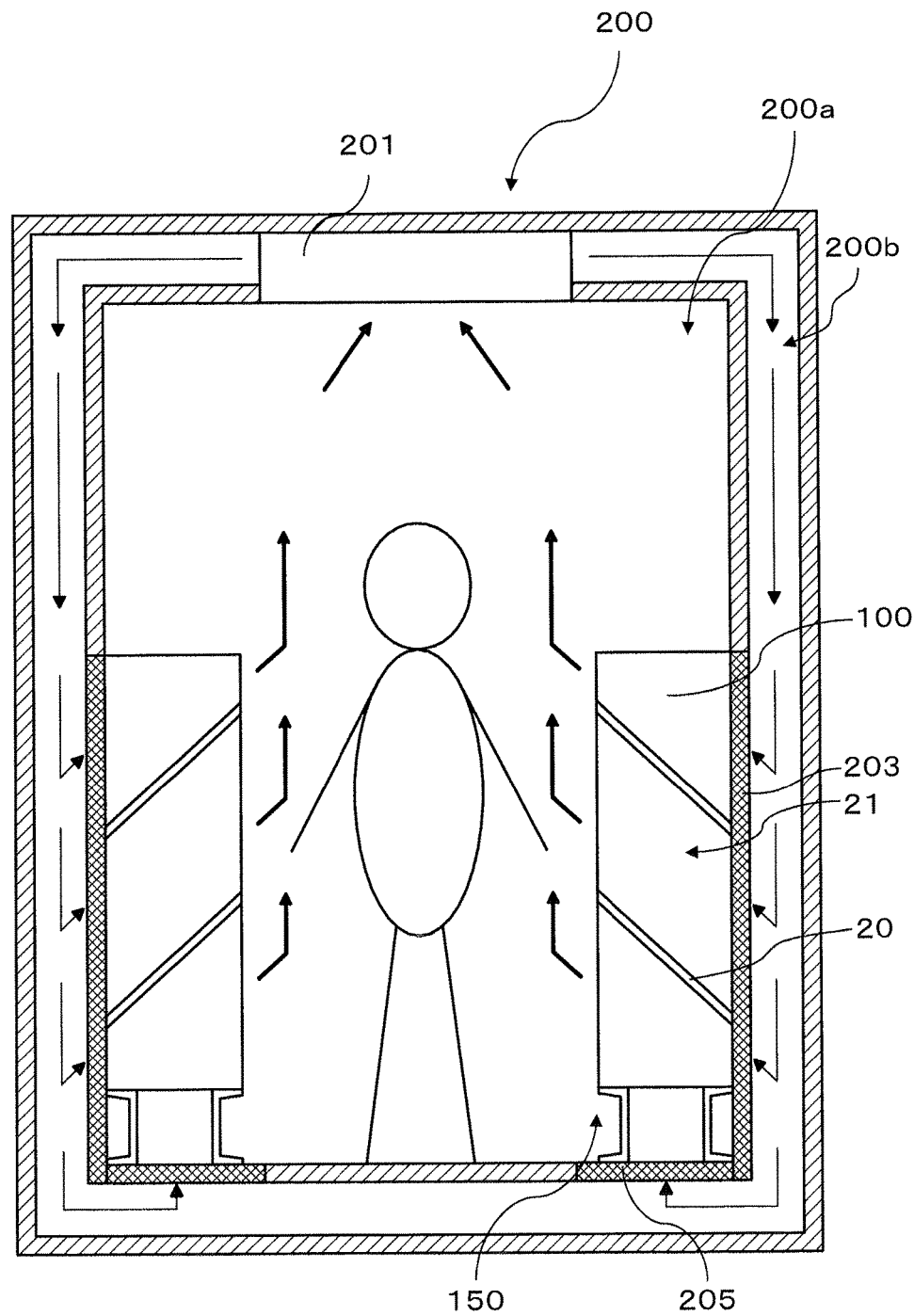
FIG. 4 illustrates a battery-pack mounting container in which battery packs of this embodiment are provided.

An example where the installing battery pack 150 illustrated in FIG. 3 is installed will be described with reference to FIG. 4. FIG. 4 illustrates a battery-pack mounting container 200 (container 200) in which the battery packs 100 of this embodiment are provided. That is, FIG. 4 illustrates the container 200 in which the installing battery packs 150 illustrated in FIG. 3 are mounted.

The container 200 has a workroom 200a in which a worker works and the installing battery packs 150 (battery packs 100) are installed. A flow channel 200b, through which air discharged from an air conditioner 201 flows, is provided on the periphery of the workroom. 200a. That is, the flow channel 200b is provided on the periphery of the workroom 200a and is an in-container flow channel through which a gas to flow into the flow channels 21 provided in the installing battery packs 150 (battery packs 100) flows.

In the workroom 200a, two installing battery packs 150 are provided along side walls. Both the installing battery packs 150 are provided so that the inclination of the partition members 20 is small on sides facing side walls 203 of the workroom 200a and is large on sides facing the worker. That is, the battery packs 100 are provided so that inflow sides of the gas flowing through the flow channels 21 face inner walls of the container 200. More specifically, the battery packs 100 are provided to face the inner walls of the workroom 200a in the container 200.

The air conditioner 201 is provided in an upper part of the workroom 200a. The air conditioner 201 sucks up warm air (warm air discharged from the installing battery packs 150) in the workroom 200a, cools the warm air, and then supplies the air as cooling air to the flow channel 200b.

The side walls 203 of the side walls of the workroom 200a, which face the installing battery packs 150, are formed to be open, to be meshed, or to have a slit so that air is flowable. That is, the side walls 203 (inner walls) facing the installing battery packs 150 (battery packs 100) are provided so that a gas is flowable therethrough. Floor surfaces 205 under the installing battery packs 150 are similarly provided. Note that an area where a worker works (performs maintenance) and side walls 206 that do not face the installing battery packs 150 are formed by a wall, a curtain, or the like, through which air does not flow.

Flow of air in the container 200 will be described.

Cold air (cooled air) discharged from the air conditioner 201 flows through the flow channel 200b so as to flow toward a lower part of the workroom 200a (thin arrows in FIG. 4). The flow channel 200b can be referred to as a so-called cold aisle. When the cold air flowing through the flow channel 200b reaches the side walls 203 and the floor surfaces 205 through which air is flowable, the cold air permeates the side walls 203 and the floor surfaces 205 and contacts with the battery packs 100. Then, the cold air that has contacted with the battery packs 100 rises along the partition members 20 and is discharged into the workroom 200a (thick arrows in FIG. 4). Therefore, the workroom 200a can be referred to as a so-called hot aisle. In this way, the battery packs 100 are cooled. The air that has removed heat from the battery packs 100 and has been discharged into the workroom 200a rises due to heat itself and is sucked by the air conditioner 201. In the air conditioner 201, the heat of the air from the workroom 200a is removed and the air is supplied again to the flow channel 200b. As described above, in the container 200, a circulation cycle is formed so that a gas is circulated by passing through the flow channel 200b (in-container flow channel), the side walls 203 (inner walls), the flow channels 21 provided in the installing battery packs 150 (battery packs 100), and the workroom 200a in this order.

As described above, in the container 200, the battery packs 100 are cooled by using natural convection of air. The air discharged from the battery packs 100 are appropriately heated, and therefore it is also possible to set an environmental temperature so that a worker comfortably works in the workroom 200a. Therefore, by providing the air conditioner 201 for supplying air only to the battery packs 100 instead of providing the air conditioner 201 for controlling the temperature in the workroom 200a, it is possible to effectively cool the battery packs 100 and maintain an appropriate temperature in the workroom 200a.

In the container 200, as illustrated in the figure, air supply and exhaust means such as an air-supply fan and an air-exhaust fan is not provided, and air discharged from the air conditioner 201 flows due to natural convection by using a temperature of the air. Therefore, power consumption of the air supply and exhaust means can be reduced and a space for providing the air supply and exhaust means can be reduced.

2. Modification Examples

This embodiment has been described in the above description, but this embodiment is not limited to the above contents. Hereinafter, modification examples will be described. Note that the following modification examples can be implemented in combination as appropriate.

Figure 5:
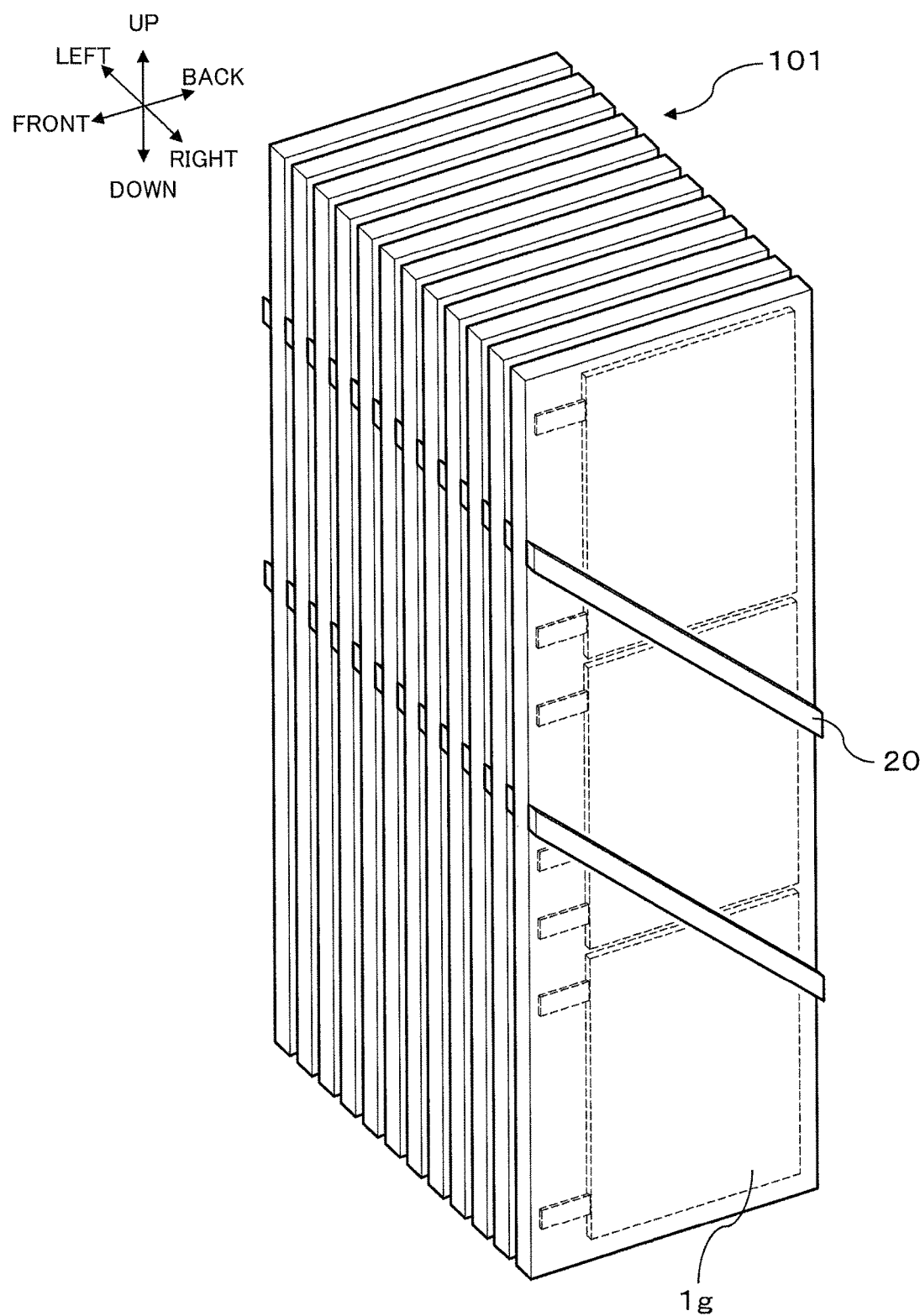
FIG. 5 illustrates a modification example of a battery module.

First Modification Example (FIG. 5)

In the example illustrated in FIG. 1, the single cells 1 in the battery modules 10 have a long size in the back and forth direction. However, as illustrated in FIG. 5, single cells 1g having a long size in the up and down direction may be used. Also in a battery pack 101 including the single cells 1g, by providing the partition members 20 in the same way as FIG. 1, a similar effect is obtained. In such a case, a single single cell may be rarely provided in a flow channel.

Figure 6:
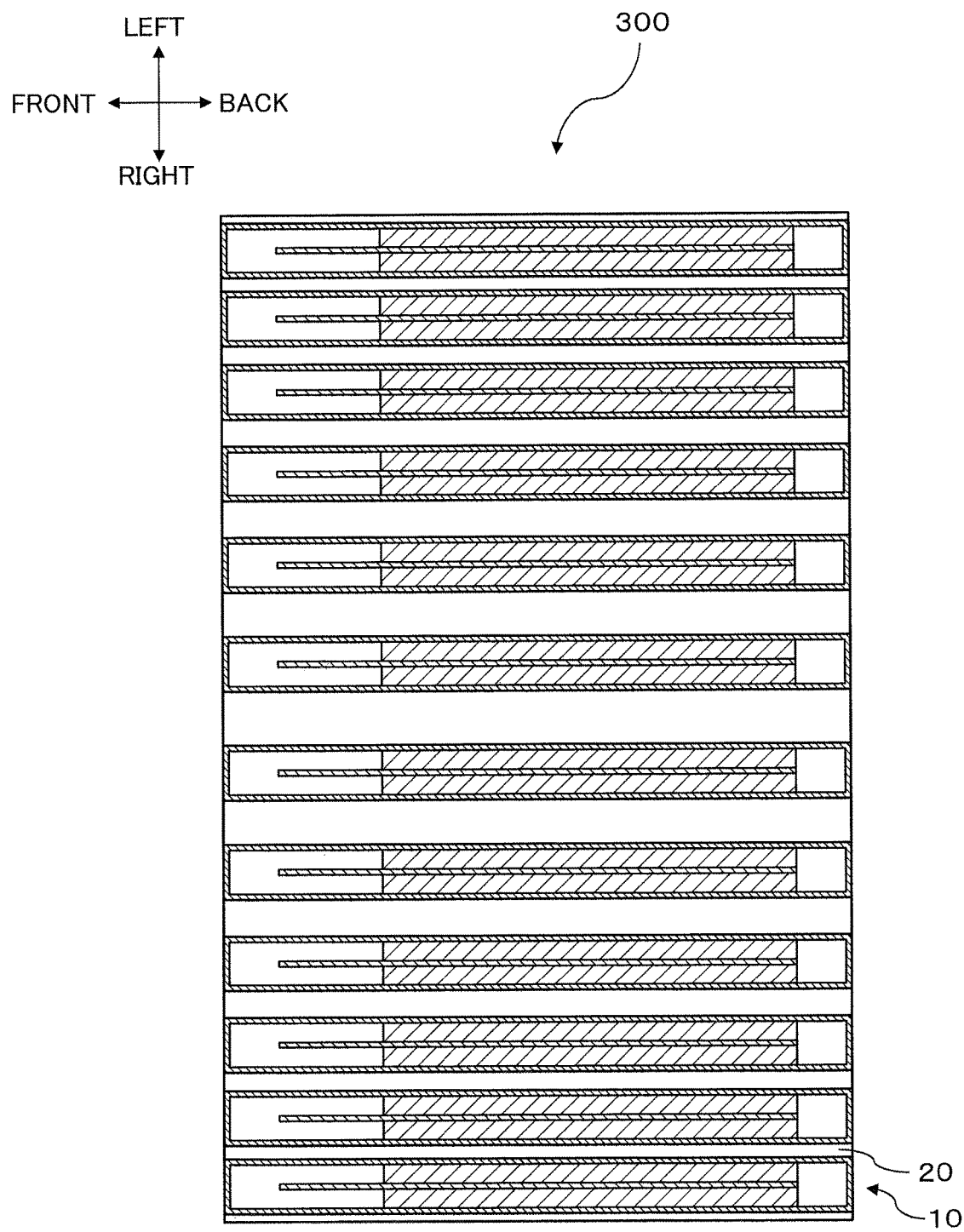
FIG. 6 illustrates a modification example of a battery pack.

Second Modification Example (FIG. 6)

In the example illustrated in FIG. 2, intervals between the adjacent battery modules 10 are equal. That is, all thicknesses of the partition members 20 in a right and left direction (vertical direction of the sheet) are equal. However, as illustrated in FIG. 6, a battery pack 300 may be formed so that the intervals become wider toward a center thereof. That is, in the battery pack 300, the plurality of battery modules 10 are provided side by side, and the intervals between the adjacent battery modules 10 become gradually wider toward a center of the plurality of battery modules 10.

Herein, the inventors of the invention performed numerical-value fluid analysis of increase in a temperature due to natural convection with respect to long modules (battery modules 10 illustrated in FIG. 1) each having two surfaces on each of which six single cells 1 were mounted. As a result, when the interval between the adjacent battery modules 10 was increased from 4 mm to 10 mm, a temperature difference between an air temperature on an inlet port side and an air temperature on an outlet port side was reduced by 30%. It is considered that this is because, by increasing the interval, more air flows and increase in a temperature of the air is reduced.

By receiving influence of reduction of the increase in the temperature of the air, temperature variation between the single cells 1 was also reduced by 30%. It is considered that temperatures are leveled by increasing the intervals as described above.

The configuration of FIG. 6 can be employed in consideration of the above points. In other words, heat is easily accumulated around a center of the battery packs and temperatures of the single cells 1 are easily increased. In view of this, by providing a wider interval between the battery modules 10 around the center of the battery pack 300, cooling of the battery modules 10 around the center of the battery pack 300 can be further promoted and the temperatures between the single cells 1 can be leveled.

Figure 7:
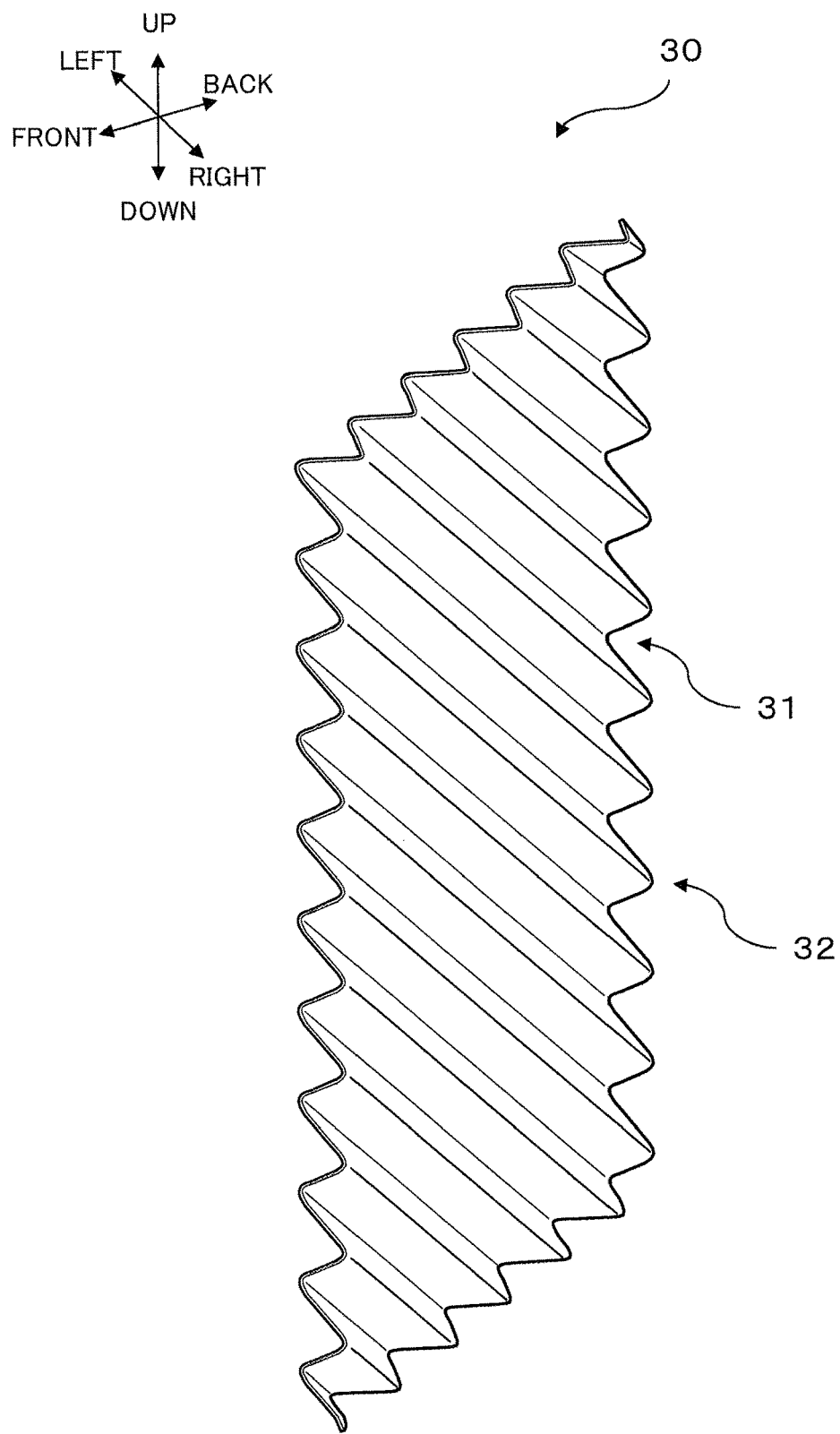
FIG. 7 illustrates a modification example of flow channels provided in a battery module.

Third Modification Example (FIG. 7)

In the example in FIG. 1, the partition members 20 are attached to the side surface of the case 3 in which the single cells 1 and the like are provided. However, the case and the partition members 20 may be integrally provided. That is, for example, as illustrated in FIG. 7, a battery module may be formed with the use of corrugated-plate like housing constituent members 30 by interposing the single cells 1 (not illustrated in FIG. 7) between two housing constituent members 30.

In the housing constituent member 30, recesses 31 and protrusions 32 having a substantially triangular cross-section are alternately and continuously formed. That is, the housing constituent members 30 have a corrugated-plate shape, and the protrusions 32 correspond to the above partition members. Therefore, it can be said that: the battery pack 100 includes the housing constituent member 30 (housing) constituting the case 3 that houses the single cells 1 included in the battery module 10; and the protrusions 32 (partition members) are provided on a side surface of the housing constituent member 30 (housing). It can be also said that: the side surface of the housing constituent member 30 (housing) has the recesses 31 and the protrusions 32; and a flow channel is provided between the adjacent protrusions 32. The housing constituent member 30 (housing) and the protrusions (partition members) are integrally provided.

By using the housing constituent member 30, production processes of the battery pack or the battery module can be reduced. Specifically, two processes, i.e., housing the single cells 1 in the case and attaching the partition members 20 are reduced, and, instead of this, it is possible to only perform a process for interposing the single cells 1 between the housing constituent members 30. Therefore, by using the housing constituent member 30, the production processes can be reduced.

Note that, although not illustrated, the cross section may have a triangular shape instead of the corrugated-plate shape.

Figure 8:
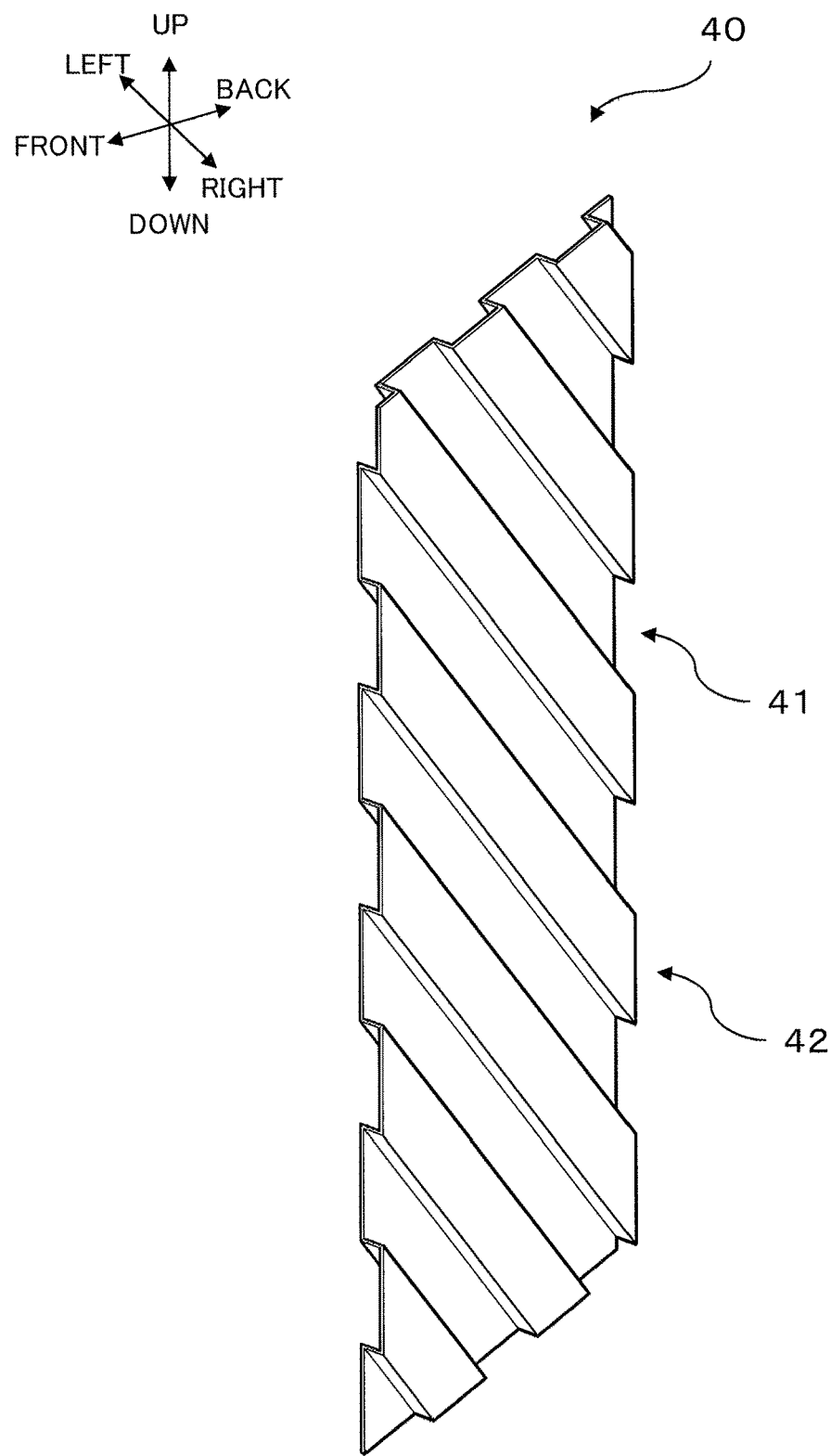
FIG. 8 illustrates a modification example of flow channels provided in a battery module.

Fourth Modification Example (FIG. 8)

A housing constituent member 40 illustrated in FIG. 8 may be employed as the housing constituent member for interposing the single cells. A battery module may be formed by interposing the single cells 1 (not illustrated in FIG. 8) between two housing constituent members 40.

In the housing constituent member 40, recesses 41 and protrusions 42 having a rectangular cross-section are alternately and continuously formed. Therefore, the housing constituent members 40 can be easily formed by, for example, press forming. The protrusions 42 correspond to the above partition members. Therefore, it can be said that: the battery pack 100 includes the housing constituent member 40 (housing) constituting the case 3 that houses the single cells 1 included in the battery module 10; and the protrusions 42 (partition members) are provided on a side surface of the housing constituent member 40 (housing). It can be also said that: the side surface of the housing constituent member 40 (housing) has the recesses 41 and the protrusions 42; and a flow channel is provided between the adjacent protrusions 42. The housing constituent member 40 (housing) and the protrusions 42 (partition members) are integrally provided. In this way, the production processes of the battery pack or the battery module can be reduced, as with the third modification example illustrated in FIG. 7.

Surfaces of the recesses 41 contacting with the single cells 1 are flat. Therefore, a contact area between the single cells 1 and the housing constituent member 40 can be wider, as compared with the example of FIG. 7. This further improves cooling efficiency of the single cells 1. Freedom of design change, such as changing sizes of the recesses 41 and the protrusions 42, is improved. Because the contact area with the single cells 1 is large as described above, the single cells 1 can be fixed more stably. With this, the single cells 1 can be fixed by surface contact and the housing constituent member 40 can be used as a spacer.

Figure 9:
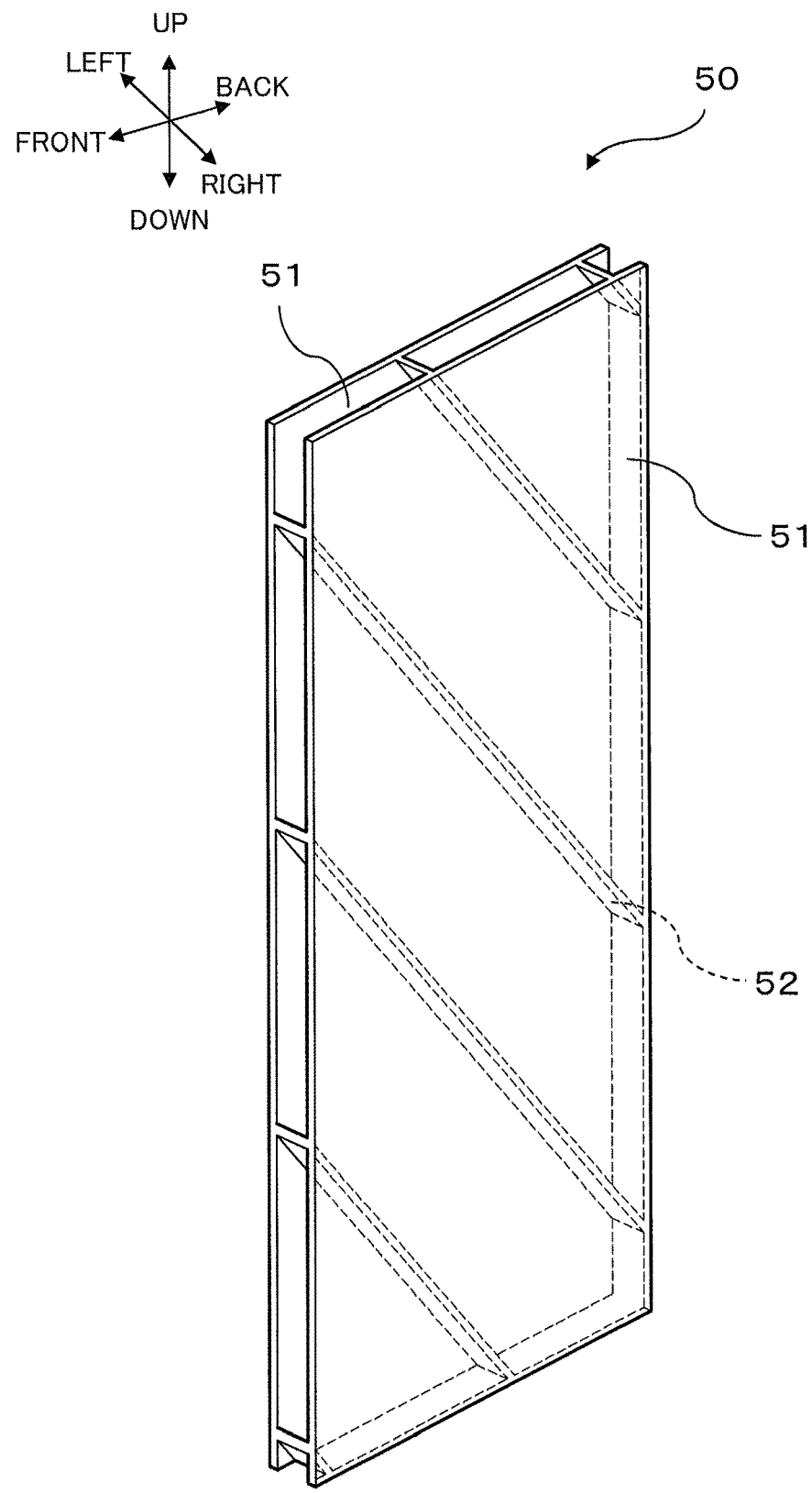
FIG. 9 illustrates a modification example of flow channels provided in a battery module.

Fifth Modification Example (FIG. 9)

A housing constituent member 50 illustrated in FIG. 9 may be used instead of the housing constituent members 30, 40 according to the third modification example (FIG. 7) and the fourth modification example (FIG. 8). The housing constituent member 50 is formed by interposing and fixing partition members 52 between two flat plates 51, 51. That is, the battery pack 100 includes the housing constituent member 50 (housing) constituting the case 3 that houses the single cells 1 included in the battery modules 10, and the partition members 52 are provided on side surfaces of the housing constituent member (housing). The flat plates 51, 51 are fixed to have an interval, and, with this, flow channels of air are provided between the flat plates 51, 51. The partition members 52 are inclined as illustrated in the figure, and therefore air flowing through the flow channels rises along the partition members 52.

In a case where a battery module is formed with the use of the housing constituent member 50, the single cells contact with a whole surface of the flat plate 51. Therefore, by using the housing constituent member 50, the single cells can be interposed and fixed stably in particular. By using a metal having a high thermal conductivity such as aluminum as a partition material and forming many protrusions and recesses on a surface, a temperature reduction effect caused by increase in a heat transfer area can be also expected. In such a case, a contact area between the single cells 1 and the housing constituent member 50 is the largest, and therefore the cooling efficiency of the single cells is particularly large. The flat plate 51 constituting the housing constituent member 50 has high rigidity, and therefore assimilability of the battery module is improved. Further, the production processes of the battery pack or the battery module can be reduced.

Figure 10:
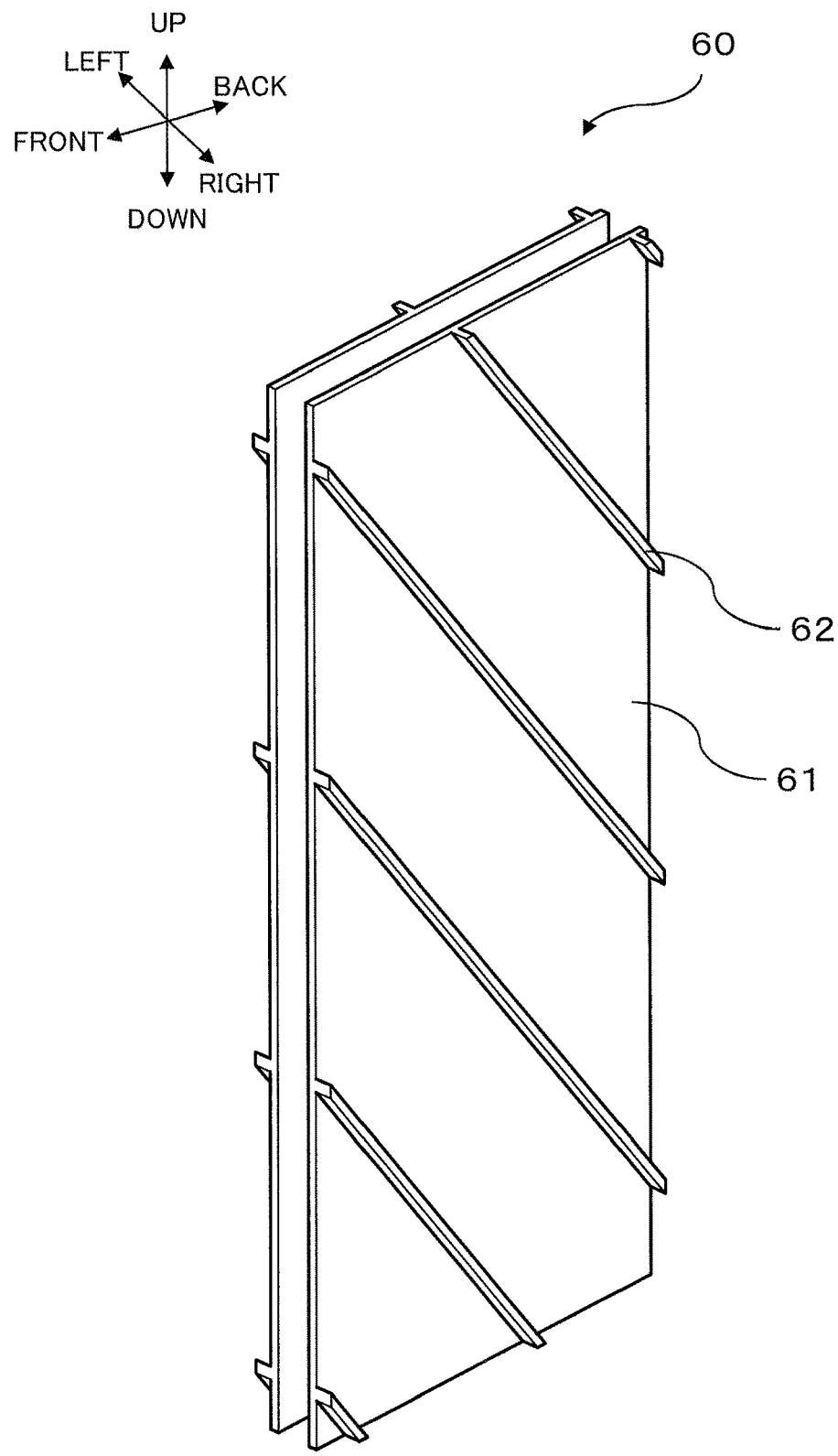
FIG. 10 illustrates a modification example of flow channels provided in a battery module.

Six Modification Example (FIG. 10)

In the example illustrated in FIG. 1, the partition members 20 are provided (attached) to the side surface of the case. Instead of this, in this six modification example, a flat plate 61 on which partition members 62 have been formed in advance is applicable. That is, a housing constituent member 60 includes the flat plates 61 and the partition members 62 integrally provided on side surfaces of the flat plates 61. That is, the battery pack 100 includes the housing constituent member 60 (housing) constituting the case 3 that houses the single cells 1 included in the battery module 10, and the partition members 62 are provided on side surfaces of the housing constituent member 60 (housing). The housing constituent member 60 (housing) and the partition members 62 are integrally provided by integral molding.

By interposing and fixing the single cells 1 with the use of the housing constituent member 60, the assimilability of the battery module is improved. Further, the production processes of the battery pack or the battery module can be reduced.

Figure 11:
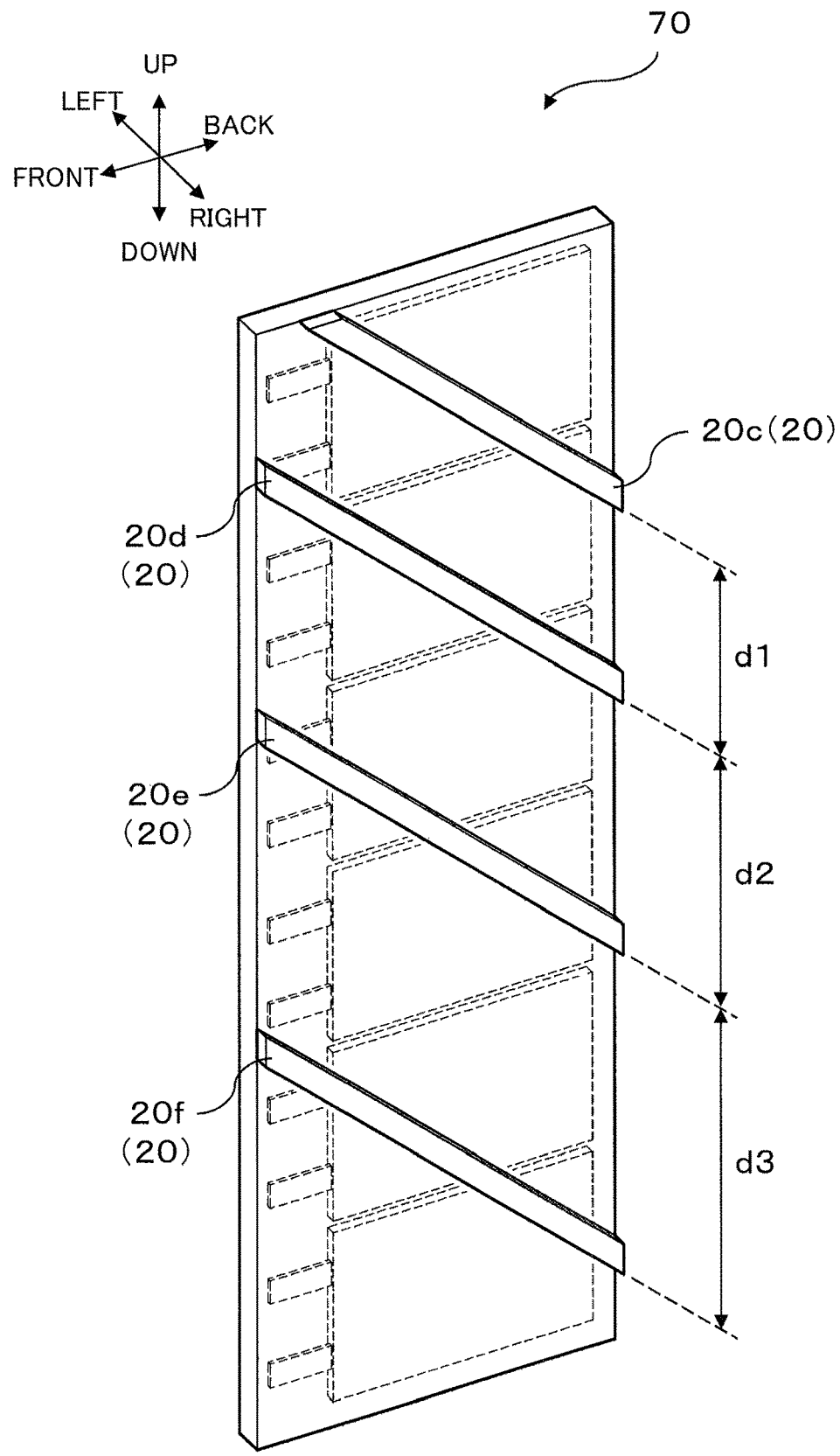
FIG. 11 illustrates a modification example of flow channels provided in a battery module.

Seven Modification Example (FIG. 11)

Intervals of the partition members 20 provided on the side surface of the case 3 in the up and down direction may be equal or may be different. That is, the plurality of partition members 20 are provided, and an interval between adjacent partition members 20 may be different from an interval between other adjacent partition members 20. For example, as in a battery module 70 illustrated in FIG. 11, an interval (d1) between the partition members 20 in an upper side of the battery module 70 may be shorter than an interval (d3) between the partition members 20 in a lower side of the battery module 70. Specifically, in the battery module 70 illustrated in FIG. 11, the interval between the partition members 20c, 20d, i.e., a distance d1, is the shortest, the interval between the partition members 20d, 20e, i.e., a distance d2, and the interval between the partition members 20e, 20f, i.e., a distance d3 are increased in this order. Note that those intervals can be appropriately set depending on a heat generation amount of the single cells 1, a size of the battery module 70, or the like.

As described above, air that has contacted with the side surface of the battery module generates natural convection due to increase in a temperature thereof and rises. Therefore, in the battery module, a temperature of the single cell on the upper side is easily increased. In view of this, the interval on the upper side is decreased to cause a flow channel of air to become narrower. With this, large increase in a temperature of air can be avoided, and the temperatures of the single cells 1 can be leveled more securely. Meanwhile, the interval on the lower side is increased to cause the flow channel of air to become wider. With this, a temperature of the whole module can be leveled.

Figure 12:
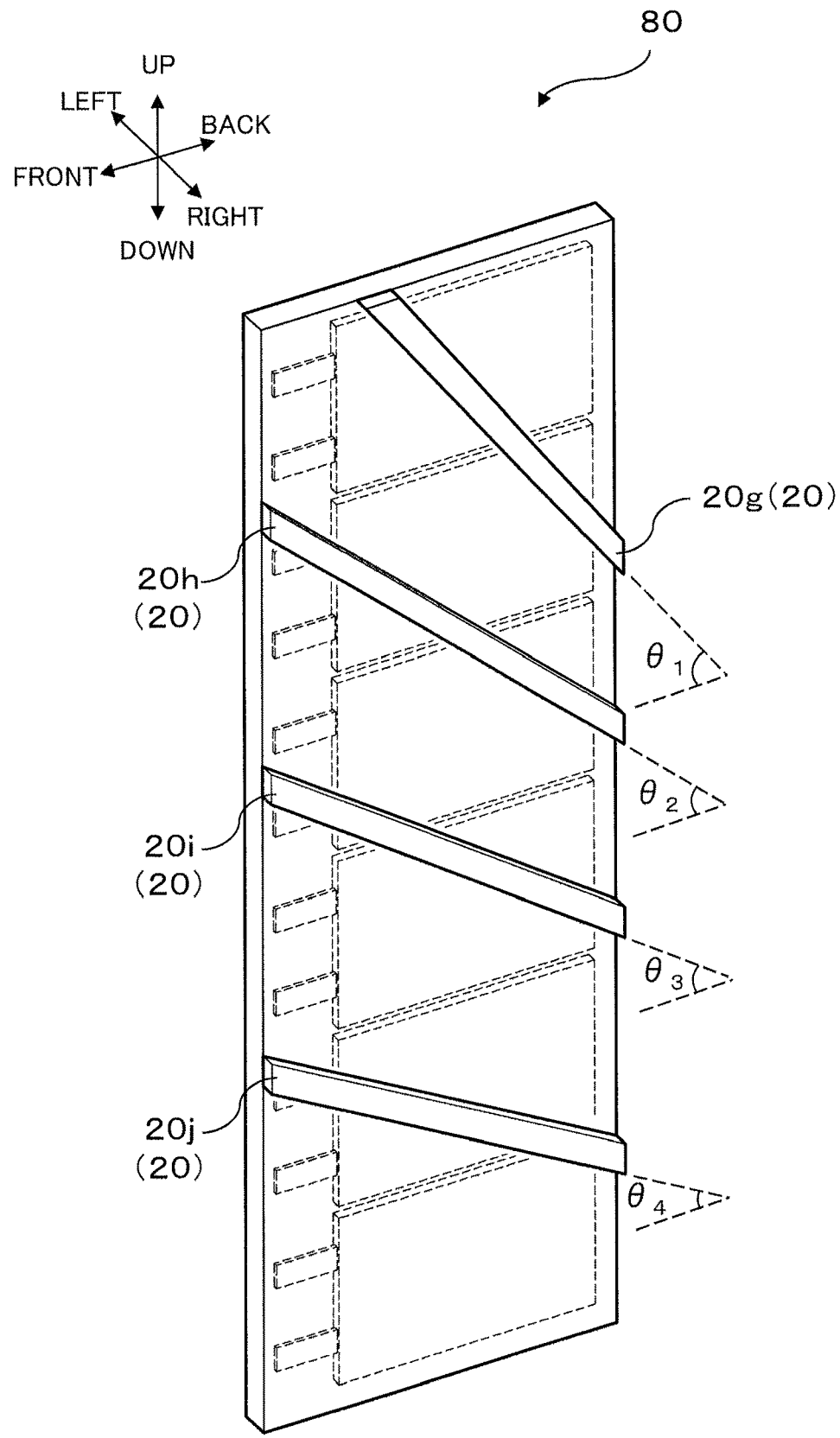
FIG. 12 illustrates a modification example of flow channels provided in a battery module.

Eight Modification Example (FIG. 12)

As illustrated in FIG. 12, the partition members 20 may be differently inclined. In a battery module 80 illustrated in FIG. 12, an angle $\theta_1$ of a partition member 20g with respect to the back and forth direction is the largest, and an angle $\theta_2$ of the partition member 20h, an angle $\theta_3$ of a partition member 20i, and an angle $\theta_4$ of a partition members 20j are reduced in this order. That is, the plurality of partition members 20 are provided, and the intervals of the adjacent partition members 20 are gradually increased in a flow direction of a gas flowing through the flow channels 21. Those angles can be appropriately set depending on the heat generation amount of the single cells 1, a size of the battery module 80, or the like. Also in the example illustrated in FIG. 12, the plurality of partition members 20 are provided, and an interval between adjacent partition members 20 is different from an interval between other adjacent partition members 20.

By providing the partition members 20 as described above, the flow channels on a discharge side of air can be larger than the flow channels on an inflow side of the air. With this, air flowing into the flow channel is promptly discharged to outside. Therefore, increase in a temperature of flowing air can be suppressed and the single cells 1 can be leveled more securely.

Figure 13:
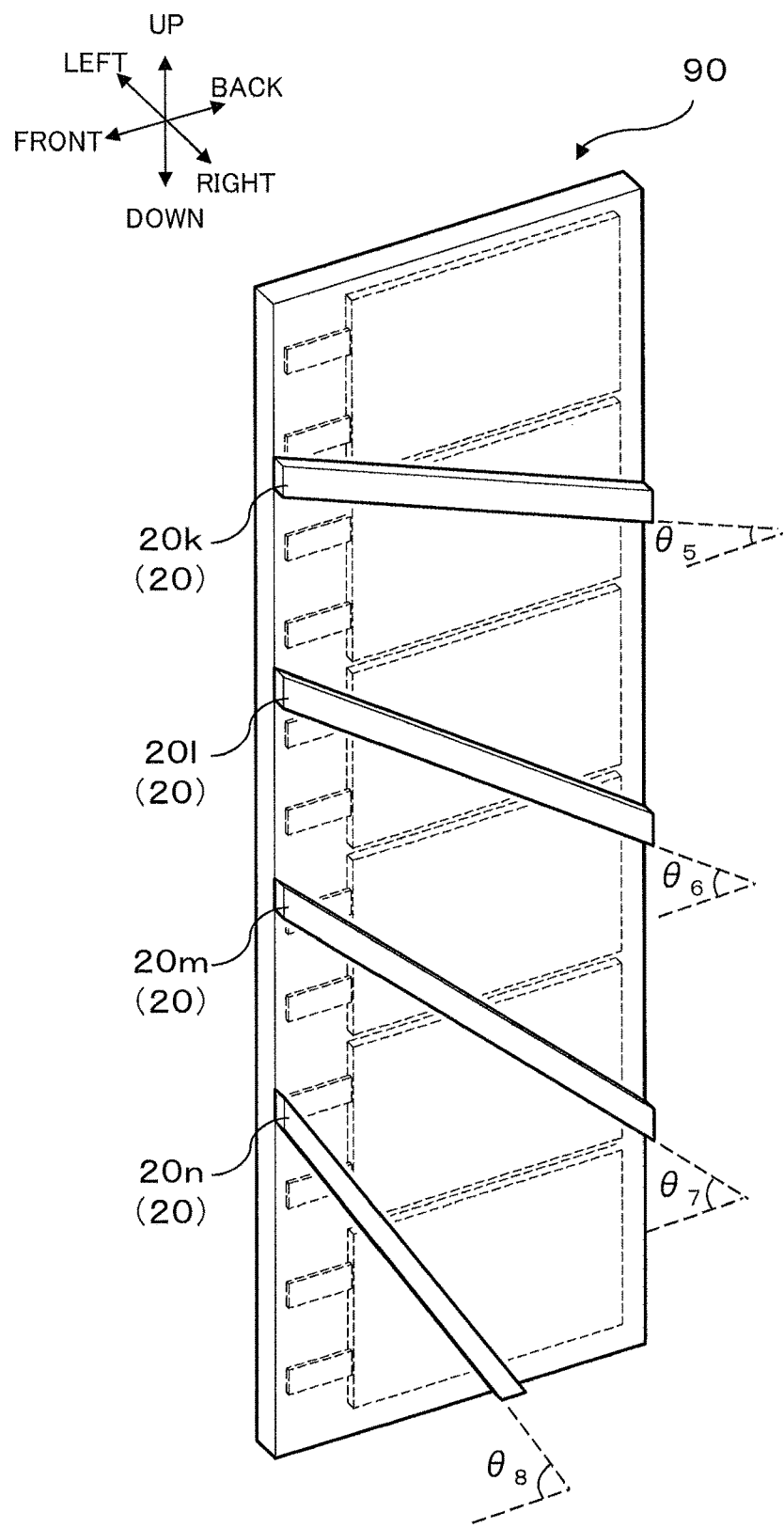
FIG. 13 illustrates a modification example of flow channels provided in a battery module.

Ninth Modification Example (FIG. 13)

In the eight modification example (FIG. 12), the angles are increased toward the upper side. However, as illustrated in FIG. 13, angles may be increased toward a lower side. That is, in the battery module 90 illustrated in FIG. 12, an angle $\theta_8$ of the lowest partition member 20 is the largest, and an angle $\theta_7$ of a partition member 20m, an angle $\theta_6$ of a partition member 20l, and an angle $\theta_5$ of a partition member 20k are reduced in this order.

Also in the example illustrated in FIG. 13, the plurality of partition members 20 are provided, and an interval between adjacent partition members 20 is different from an interval between other adjacent partition members 20.

By providing the partition members 20 as described above, it is possible to reduce an area where air contacts in the same flow channel with the upper single cell 1 whose temperature is largely increased. In this way, increase in a temperature of flowing air can be suppressed, and the temperatures of single cells 1 can be leveled more securely.

Figure 14:
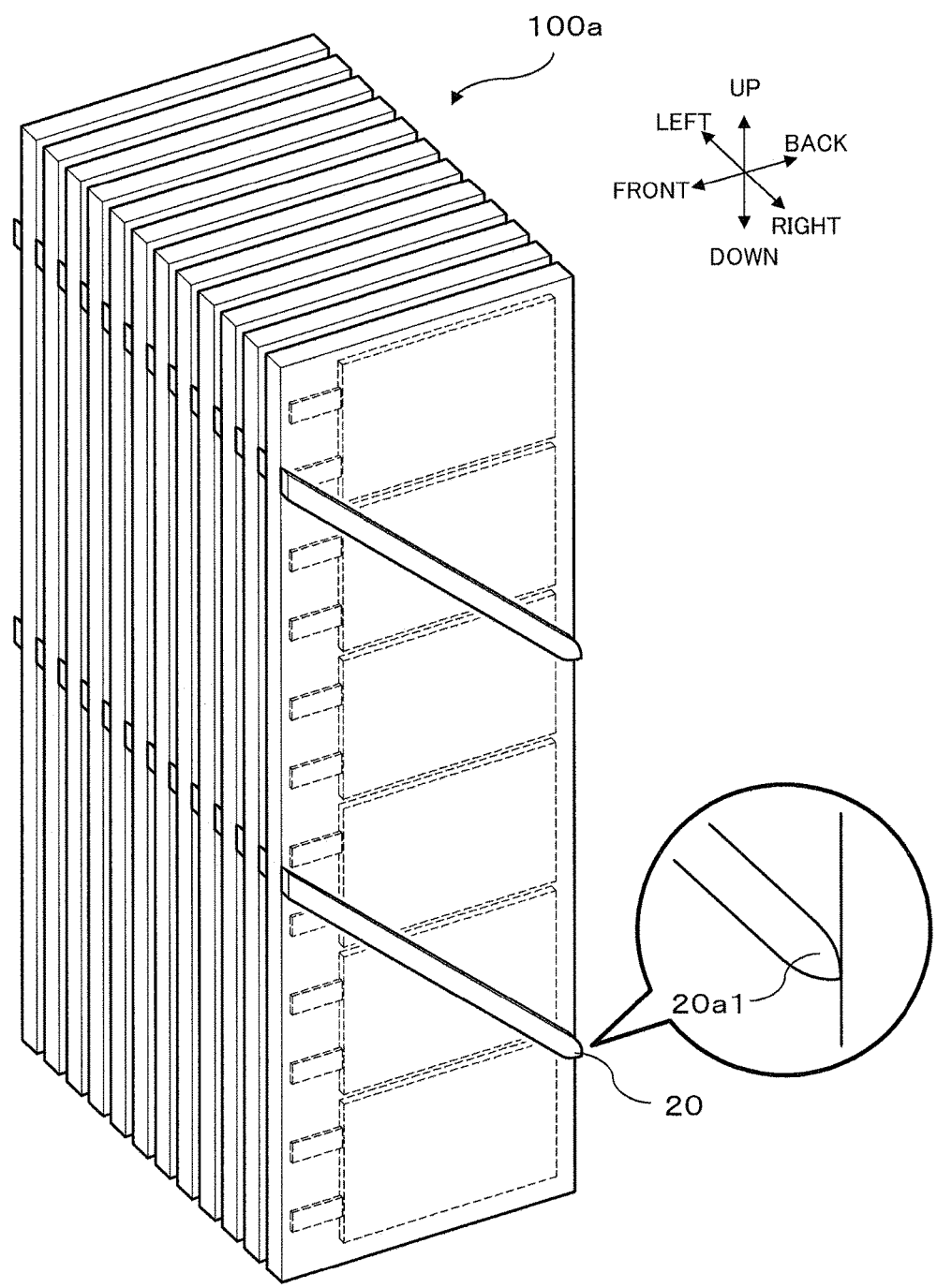
FIG. 14 illustrates a modification example of flow channels provided in a battery module.

Tenth Modification Example (FIG. 14)

As a shape of the partition members 20, end portions 20a1 on an inflow side (back side) of air may have a streamline shape, as in a battery module 100a illustrated in, for example, FIG. 14. The end portions 20a1 may have, for example, a triangular shape or a semicircular shape so that air easily flows.

By forming the end portions 20a1 of the partition members 20 as described above, an inlet flow channel of air can be widened. This makes it possible to introduce more air. Therefore, the temperatures of the single cells 1 can be leveled more securely.

Other Modification Examples

The following modification examples are applicable in addition to the above modification examples.

For example, the number of battery modules 10 and the number of single cells 1 included in the battery pack 100 or the like described with reference to FIG. 1 or the like are not limited to the illustrated example and can be arbitrarily changed. Therefore, for example, the battery pack may be formed by appropriately combining at least one battery module and at least one partition member. As described above, the housing constituent member including the partition member may be used instead of the partition member or together with the partition member as necessary. The number and a size of the partition members, a size of the flow channel, and the like are not also particularly limited and can be arbitrarily changed as long as the partition member is provided so that the plurality of single cells 1 face each other in the flow channel.

For example, the intervals between the adjacent battery modules 10 described with reference to FIG. 2 and FIG. 6 are not particularly limited and may be appropriately set depending on heat generated from the single cells 1, a size of the battery modules 10, or the like.

For example, the configuration of the container 200 described with reference to FIG. 4 is also not particularly limited, and, for example, a size, the installation number, and a form (e.g., two installing battery packs 150 are stacked in a height direction) of the installing battery packs 150 can be arbitrarily changed.

The gas flowing through the flow channel is not necessarily air. Therefore, nitrogen, carbon dioxide, or the like may be appropriately determined in accordance with, for example, an environment in which the battery pack is installed.

REFERENCE SIGNS LIST 1 single cell
1aa electrode terminal
10, 20, 30, 40, 50, 60, 70, 80, 90, 100a battery module
100 battery pack
20, 32, 42, 52, 62 partition member
21 flow channel
200 container
200a workroom
200b flow channel (in-container flow channel)
203 side wall (inner wall)

The invention claimed is:

1. A battery pack, comprising:
a plurality of battery modules arranged in a left and right direction;
each battery module includes a plurality of single cells arranged in an up and down direction in a line to define a module height such that each battery module has a short length in a front and back direction that is shorter than the module height; and
a plurality of partition members provided on a side surfaces of each battery module and forming a plurality of flow channels with an opposing surface, wherein each partition member:
is provided so that gas flowing through the plurality of flow channels exchanges heat with at least two of the plurality of single cells,
is inclined with respect to a plane orthogonal to the up and down arrangement direction of the plurality of battery modules,
is provided so that a height of each partition member in the up and down arrangement direction is gradually increased in a flow direction of the gas flowing through the plurality of flow channels, and
is provided continuously from one end to an opposite end of each battery module along the short length of the plurality of battery modules extending across at least the entirety of a first cell and a portion of a second cell of the plurality of single cells adjacent to each other in the up and down direction.

2. The battery pack according to claim 1, wherein at least one partition member is inclined at an angle of 45° or more but 60° or less with respect to the plane orthogonal to the up and down arrangement direction.

3. The battery pack according to claim 1, comprising a housing constituent member on which recesses and protrusions are continuously provided, the recesses and protrusions thereby defining the plurality of partition members, wherein
the plurality of flow channels are provided between adjacent protrusions.

4. The battery pack according to claim 1, comprising a housing constituting a case that houses the plurality of single cells included in each battery module, wherein the plurality of partition members are provided on respective side surfaces of the housing.

5. The battery pack according to claim 4, wherein the housing and the plurality of partition members are integrally provided.

6. The battery pack according to claim 1, wherein an interval between adjacent partition members is different from an interval between other adjacent partition members.

7. The battery pack according to claim 1, wherein an interval between adjacent partition members is gradually increased in the flow direction of the gas flowing through each flow channel of the plurality of flow channels.

8. The battery pack according to claim 1, wherein intervals between adjacent battery modules are gradually increased toward a center of the plurality of battery modules.

9. A battery-pack mounting container, wherein the battery pack according to claim 1 is mounted therein.

10. The battery-pack mounting container according to claim 9, wherein
the battery pack is provided so that an inflow side of the gas flowing through the plurality of flow channels faces an inner wall of the container.

11. The battery-pack mounting container according to claim 10, comprising:
a workroom in which the battery pack is installed; and
an in-container flow channel that is provided in the periphery of the workroom and through which the gas to flow into the plurality of flow channels provided in the battery pack flows, wherein
the battery pack is provided to face an inner wall of the workroom in the container;
the inner wall facing the battery pack is provided so that the gas is flowable through the inner wall; and
a circulation cycle is formed so that the gas is circulated by passing through the in-container flow channel, the inner wall, the plurality of flow channels provided in the battery pack, and the workroom in this order.

12. The battery pack according to claim 1, wherein electrode terminals of the plurality of single cells arranged in the up and down direction in the line are provided in the direction orthogonal to the up and down arrangement direction, and
the plurality of partition members are provided so that the electrode terminals are provided downstream the flow direction of the gas flowing through the plurality of flow channels.

* * * * *